United States Patent [19]

Nishimura et al.

[11] Patent Number: 4,677,489
[45] Date of Patent: Jun. 30, 1987

[54] IMAGE PICKUP APPARATUS

[75] Inventors: Tetsuharu Nishimura; Hideo Yokota, both of Kanagawa; Masatake Kato, Tokyo, all of Japan

[73] Assignee: Canon Kabushiki Kaisha, Tokyo, Japan

[21] Appl. No.: 774,805

[22] Filed: Sep. 11, 1985

[30] Foreign Application Priority Data

Sep. 19, 1984 [JP] Japan ............................... 59-196181
Sep. 19, 1984 [JP] Japan ............................... 59-196182

[51] Int. Cl.$^4$ ........................................... G03B 5/335
[52] U.S. Cl. ......................... 358/213.13; 358/213.19; 358/225; 358/909
[58] Field of Search ................ 358/211, 213, 225–228, 358/909; 354/416, 417, 429–432, 476, 480, 482

[56] References Cited

U.S. PATENT DOCUMENTS 3,568,582 3/1971 Uchida et al. ...................... 354/417
3,944,817 3/1976 Hilsum et al. ................... 358/228 X
4,366,501 12/1982 Tsunekawa et al. ........... 354/416 X
4,470,685 9/1984 Tsunekawa et al. ................ 354/416

FOREIGN PATENT DOCUMENTS 163979 12/1980 Japan ................................... 358/213

OTHER PUBLICATIONS

Powell, Ke, "CCTV Automatic Level Control", IBM Technical Disclosure Bulletin, vol. 19 No. 12, May 1977, pp. 4779–4780.

Primary Examiner—W. B. Perkey
Attorney, Agent, or Firm—Toren, McGeady & Associates

[57] ABSTRACT

An image pickup apparatus including an electrical image sensor, means for detecting the reflection of a light beam incident on the image sensor, and control means for controlling the operation of the image sensor in accordance with the output of the detecting means so that the output signal of the image sensor has always a proper level.

19 Claims, 6 Drawing Figures

IMAGE PICKUP APPARATUS

BACKGROUND OF THE INVENTION

1. Field of the Invention

This invention relates to an image pickup apparatus which enables light metering information of high accuracy to be obtained in a short time.

2. Description of the Prior Art

In the art of single lens reflex cameras using silver-halide film, it has already been known to utilize the reflected light from either the film surface or a diffraction grating in front of the film plane in the through-the-lens (TTL) light metering.

In the art of image pickup apparatus using image sensors, for example, electronic still cameras, on the other hand, a trend of opinion has so far prevailed that the reflected light from the image receiving surface of the sensor is of no valuable use, because the brightness information of an object to be photographed can be obtained from the output of the image sensor by using integrating means or the like.

To provide for such image pickup apparatus with a picture monitor in the form of an optical finder, however, though a half mirror is only required to use for splitting part of the entering light beam off to the finder, there is a drawback that the sensitivity of the image sensor sharply drops, and the finder also gives dim or uncomfortable viewing.

This problem will be overcome by substituting a quick return mirror for the half mirror.

But, this leads to produce an alternative problem in photographic situations where information representing that brightness which occurs at a time when the mirror starts to move upward is necessary to obtain just at that time from the image sensor, because it takes a certain period to read out all signal for each frame from the image sensor. For example, 1/60 sec. for NTSC system, or 1/50 sec. for PAL or SECAM system has passed form the above-identified time before the light metering information is obtained. To complete the derivation of an exposure value with high accuracy in far shorter time than these values of the period as, for example in flash photography where adjustment of the firing time of the flash unit must be accurately controlled by a stop signal, therefore, the use of the output of the image sensor as the light metering information could not provide assurance that the stop signal is produced in so much accurately timed relation to the start of firing.

SUMMARY OF THE INVENTION

A first object of the invention is to eliminate the above-described drawbacks of the prior art.

A second object concomitant with the first object is to provide an image pickup apparatus with means measuring the reflected light from the image-receiving surface of an image sensor, thereby high accurate light value information can be obtained immediately.

A third object concomitant with such second object is to provide an image pickup apparatus in which use is made of an optical member for reflecting part of a light beam that will be incident on the image receiving surface of the image sensor to a particular direction, whereby the means for receiving the reflected light is positioned in that particular direction.

A fourth object concomitant with such second object is to provide an image pickup apparatus in which the image receiving surface of the image sensor is provided with an optical member for reflecting a particular wavelength region of light, and the means for receiving the reflected light is sensitive to that spectral region.

A fifth object is to employ both of that optical member which is previously provided in front of the image sensor and that optical member which reflects the abovementioned particular wavelength region but in a common form with an advantage of preventing the use of such optical member from giving a bad influence to the output of the image sensor.

DETAILED DESCRIPTION OF THE PREFERRED EMBODIMENT

Figure 1:
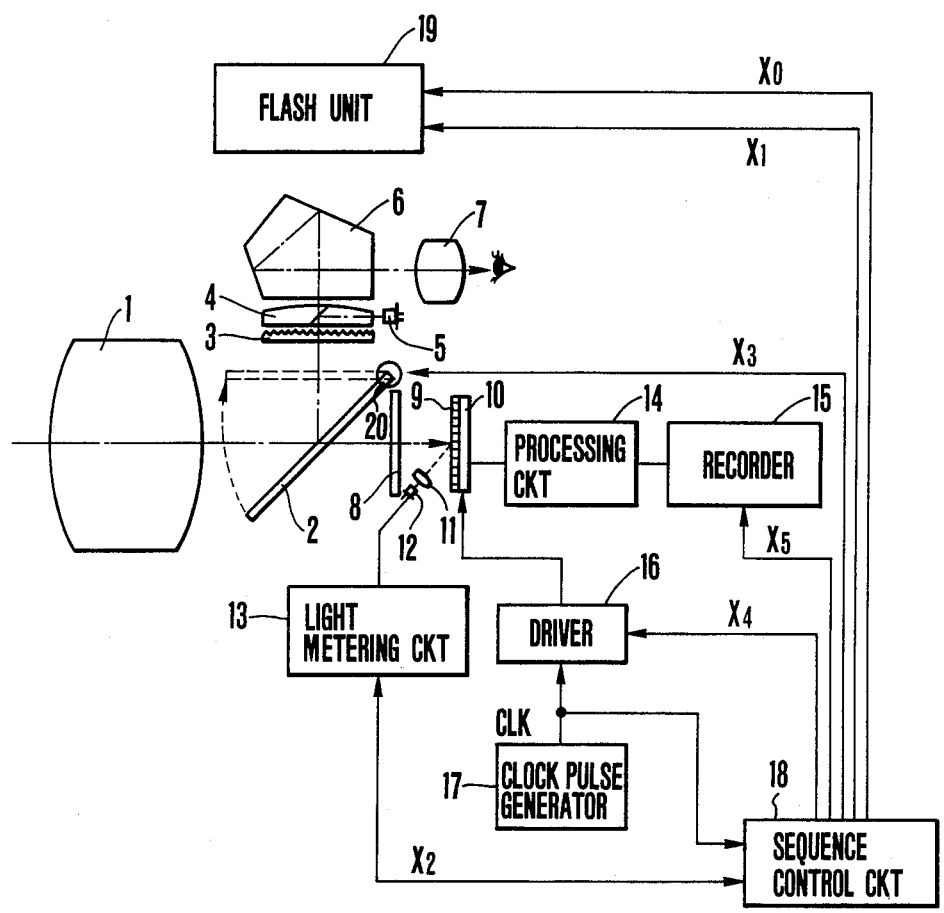
FIG. 1 is a schematic sectional view, partly in block form, of an electronic camera employing the image pickup apparatus of the invention.
Figure 4:
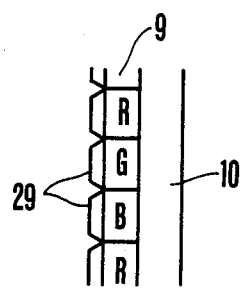
FIG. 4 is a fragmentary sectional view in greatly enlarged scale of the color filter of FIG. 2 on the image sensor.

The present invention will next be described in connection with an embodiment thereof as applied to the electronic camera by reference to the drawings. In FIG. 1, a photographic lens 1, a quick return mirror 2, a focusing screen 3, a condenser lens 4 having a half-reflection mirror built therein, a photo-electric transducer element 5 for daylight photography, a pentagonal roof type prism, an eyepiece lens 7, an optical low pass filter 8, and a-color filter of stripe-shaped pattern whose cross-section in a direction perpendicular to the paper is illustrated in FIG. 4 where three stripes R, G and B for transmitting red, green and blue lights alternate with one another, constitute part of the electronic camera.

In this embodiment, the filter 9 is provided with high reflection means having such characteristics that an infrared region from 700 to 1200 nm is reflected, while a visible region from 400 to 700 nm is transmitted, in the form of an array of stripes of infrared reflection coating 29 applied on the front surface of the color separation filter 9 by vacuum evaporation coating techniques with an equal period to that of the image receiving surface of a solid state image pickup element 10 of the accumulation type. Such an infrared reflection coating 29, therefore, functions as a diffraction grating. Instead of the solid state image pickup element as the image sensor, an image pickup tube may be used.

The reflected infrared light from the coating 29 is collected by a lens 11 and received by a photo-electric transducer element 12 for flash photography. Responsive to change of a signal X2 from H to L level, a light metering circuit 13 starts to integrate the output of the photo-electric transducer element 12. When the integrated amount of the output reaches a prescribed level, the light metering circuit 13 changes the signal X2 from L to H level.

The output of the solid state image pickup element 10 is processed by a processing circuit 14 for gamma-correction, aperture-correction and the like and is then applied to a recorder 15. Responsive to rising of a signal X4 to H level, a driver 16 allows the image pickup element 10 to be read out. A clock pulse generator 17 produces a train of clock pulses CLK from which various timing signals are formed.

A sequence control circuit 18 controls the sequence of operations of the electronic camera and a flash unit 19. An electric motor 20 is drivingly connected to the quick return mirror, and its operation is controlled by a signal X3.

Figure 3:
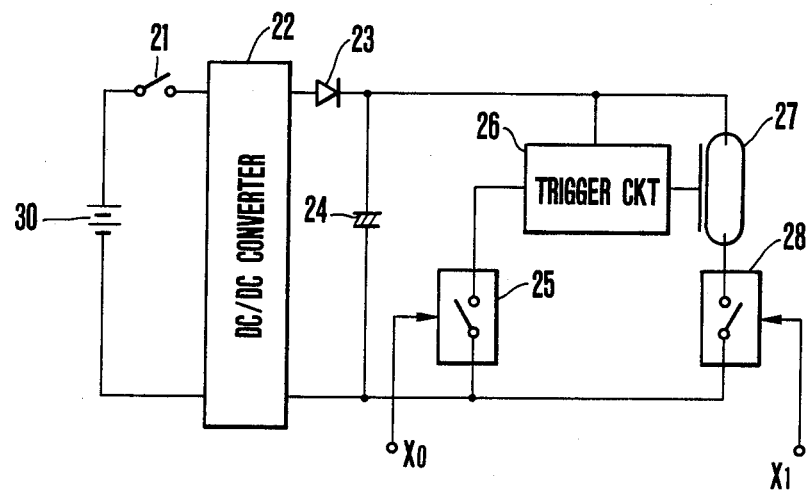
FIG. 3 is an electrical circuit diagram of a flash unit usable with the electronic camera of FIG. 1.

The flash unit 19 usable with such an electronic camera is constructed as shown in FIG. 3, including a battery 30, a main switch 21, a DC-DC converter 22, a reverse current preventing diode 23, a storage capacitor 24, a trigger switch 25, a trigger circuit 26, a xenon tube 27, a discharge control switch 28 for the tube 27, and inlets X0 and X1 to which control signals for the switches 25 and 28 respectively are applied from the sequence control circuit 18.

The operation is as follows. When in daylight exposure mode, light metering is performed by the quick return mirror 2 in its viewing position where light entering through the photographic lens 1 is reflected to the focusing screen 3. Light from the focusing screen 3 when passing through the condenser lens 4 is partly reflected by the half reflection mirror sideward to the photo-electric transducer element 5.

Figure 5:
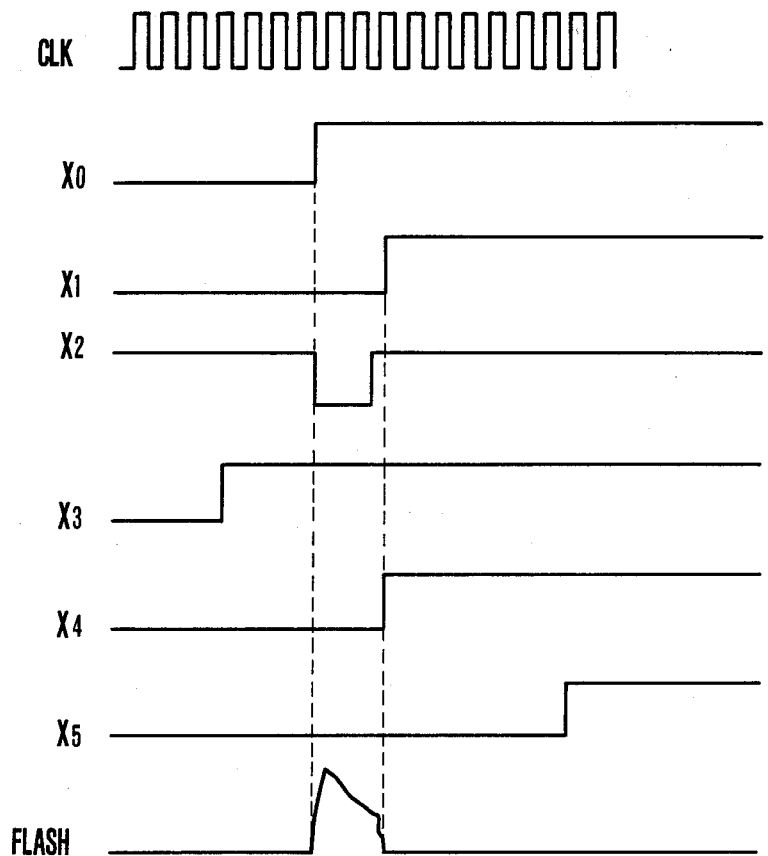
FIG. 5 are waveforms of signals at various points in FIG. 1 illustrating a manner in which the flash exposure mode of this example operates.

Explanation is now given to the operation of the flash exposure mode by reference to FIG. 5. As the flash unit is in use, when a release button (now shown) is actuated, the sequence control circuit 18 produces a signal X3 which is applied to the motor 20, thereby the quick return mirror 2 is moved upward. Just when the light path to the image pickup element is cleared, a signal X0 is produced to fire the flash tube 27. It should be noticed here that before the actuation of the shutter release the main switch 21 was closed to supply the voltage of the battery 30 to the booster or DC-DC converter 22, and the storage capacitor 24 was fully charged.

When the signal X0 changes to H level, the switch 25 turns on to actuate the trigger circuit 26. As a high voltage is applied to the trigger electrode of the xenon tube 27, it starts to fire. The firing continues until the switch 28 turns off in response to change of the signal X1 to H level.

Figure 2:
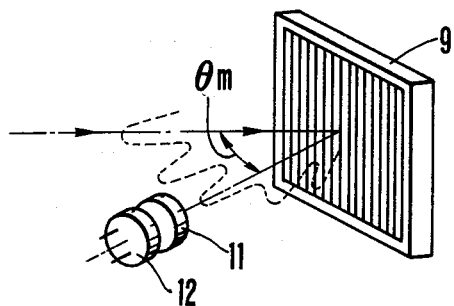
FIG. 2 is a perspective view of an arrangement of a stripe color filter for use on the image receiving surface of the image sensor and a photo-electric transducer element for use in controlling the firing time along with intensity distribution of diffracted rays from the filter as a reflection grating.

The reflection of the flash light from an object to be photographed after having passed through the optical low pass filter 8 impinges on the stripe color filter 9 over the entire area of the angular field of the photographic lens 1. Since the stripe color filter 9 and infrared reflection coating 29 have an equal period between the successive two stripes to that between the successive two rows of resolution cells of the solid state image pickup element 10 such as CCD positioned just behind them, when rays of light arrive at such surfaces from one direction, the ones of the incident rays which are infrared are reflected and diffracted with the maxima occurring at angles $\theta m$ depending on the period, P, of the stripe color filter 9 and the wavelength, $\lambda$, of the incident rays such that $\theta m = \sin^{-1}(m\lambda/P)$ where m is any whole number starting with zero. Because the wavelengths of the reflected rays from the stripe color filter 9 range from 700 to 1200 nm as has been described above, the angular dispersion is widened as shown by a dashed line curve in FIG. 2. One of such dispersed maxima is detected through the collection lens 11 by the photo-electric transducer element 12 positioned in a plane to which the incident are reflected and diffracted, in other words, a plane containing a line parallel to the direction in which the elements of the stripe color filter 9 are arrayed side by side and the optical axis of the photographic lens 1, that is a plane perpendicular to the direction of the stripes at such a location as not to block any of the arriving rays from the photographic lens 1.

Taking a numerical example of the optimum location of the photo-electric transducer element 12, on assumption that the photographic lens has an F-number of 1.4 at full open aperture with an image bearing beam of an angle of 19.7°, the product of the intensity distribution of flash light and the spectral sensitivity of the photo-electric transducer element, or overall spectral sensitivity curve, has a peak at a wavelength of 900 nm, and the period of the solid state image pickup element or infrared reflection coating is 12 $\mu$m, then the maxima of the reflected and diffracted rays occur at or near $\theta 4 = 17.5°$, $\theta 5 = 20.6°$, $\theta 6 = 24.2°$, $\theta 7 = 27.7°$, . . . Under the conditions that the image bearing beam is not affected, and that the diffracted rays can be detected with high efficiency, it is found that the most preferable location of the photo-electric transducer element is at $\theta = 20.6°$, and next to it preferable is $\theta = 24.2°$.

The output of the thus-arranged photo-electric transducer element 12 is used for controlling the firing time of the strobe in such a manner as that described in connection with the present embodiment. That is, when the output of the photo-eiectric transducer element exceeds the prescribed level, the signal X2 from the light metering circuit 13 changes from L level to H level. This signal X2 is applied to the sequence control circuit 18 which in turn produces a signal X1. This signal X2 is applied to the sequence control circuit 18 which in turn produces a signal X1. This signal X1 is applied to the flash unit 19.

Since the switch 28 is turned off by the signal X1, the xenon tube 27 stops firing, thereby the integrated amount of illumination on the object becomes proper. At the same time, the signal X4 causes the driver 16 to terminate the integration period of the image pickup element 10 and then to read out signals from the element 10. Then, responsive to a signal X5, the recorder 15 records the read-out signals.

Though, in the embodiment described above, it is by receiving the reflected and diffracted rays from the infrared reflection coating 29 provided on the stripe color filter 9 on the image pickup element 10 that the light metering sensitivity is improved over the mere reception of scattering rays, such an improvement may be attained without using the infrared reflection coating 29, but by receiving the reflected and diffracted rays from the stripe color filter 9 on the image pickup element 10.

Another example of variation is that in case an interference slit filter is used as the optical low pass filter in front of the image pickup element, the reflected and diffracted rays from this filter are detected.

Figure 6:
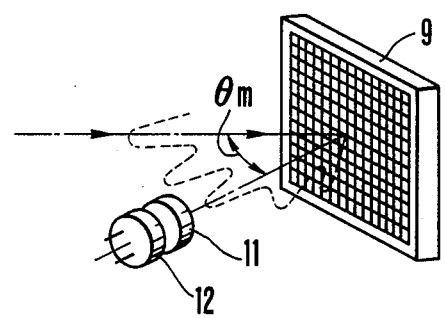
FIG. 6 is similar to FIG. 2 except that an example of modification of the stripe color filter is illustrated.

Also, it goes without saying that the present invention is applicable to another type or electronic camera in whrch the color separation filter is in the form of a plurality of stripe color filters obliquely crossed to each other for use in the frequency separation system. Another example of the usable filter is illustrated in FIG. 6, as having a repeated pattern.

Also, the present invention is applicable to still another type camera in which the surface of the image sensor has stripe-shaped or mosaic-shaped ridges due to the manufacturing process.

Further, according to the embodiment, when in flash photography, because the reflected light from the object is sensed through the photographic lens, or by the so-called TTL method in the form of the reflected light from the infrared reflection coating applied on the stripe shaped color separation filter attached to the solid state image pickup element, proper adjustment of illumination can be made. For note, the rate of the infrared component of the flash light is almost independent of the kind of flash unit, or takes a known value for all types of flash units, the reliability of accurate adjustment of illumination can be improved.

Another advantage is that the brightness of the finder image is improved when in daylight exposure mode, because only when in flash exposure mode, use is made of the reflected light from the image receiving surface of the image sensor for light metering, whilst when in daylight photography, the total reflection mirror is permitted to take its viewing position where the light metering is carried out by another photo-electric transducer element 5.

Still another advantage arising from the use of the infrared reflection coating on the color separation filter is that the infrared light which is harmful to formation of clear pictures for the image pickup apparatus can be removed without having to use a filter which would otherwise be solely used therefor.

Also, though, in this embodiment, the termination of an integrating operation of the image sensor is controlled by a deactuating signal for the flash discharge tube produced when the reflected amount of light from the image receiving surface of the image sensor reaches the prescribed level, the integrating operation may otherwise be terminated by a shutter or the like in front of the image receiving surface.

As has been described above, according to the present invention, an introduction of the TTL light metering aspect even to the electronic camera by using the reflection of part of the incident light on the image sensor makes it possible to realize a high speed response characteristic of adjusting the flash exposure value to the brightness of the object. Further, due to the collection of the reflection of the incident light on the image sensor by utilizing the diffracting effect, the sensitivity of the light metering circuit can be remarkably improved without sacrificing the brightness of the image on the image pickup element as the infrared component of wavelengths, for example, from 700 to 1200 nm, falls outside the necessary range of wavelengths for the image pickup element.

What is claimed is:

1. An image pickup apparatus comprising:
   a. image sensing means for converting a radiation into an image signal, the image sensing means having means for reflecting a part of the radiation, the wave length of said part being substantially nonresponsive to the sensing means;
   b. radiation receiving means for receiving the reflected part of said radiation by said reflecting means; and
   c. means for controlling exposure of the radiation on said image sensing means, including control circuit means for producing a control signal.

2. An image pickup apparatus according to claim 1, wherein said image sensing means includes an image sensing part for converting the radiation into the image signal, and said reflecting means having at least one reflecting surface means provided on the image sensing part.

3. An image pickup apparatus according to claim 1, wherein the wave length of the radiation is outside the range of wave lengths for infrared light or near infrared light.

4. An image pickup apparatus according to claim 2, wherein said reflecting surface means is superimposed on said image sensing part.

5. An image pickup apparatus according to claim 1, wherein said reflecting surface means has a diffractive grating surface.

6. An image pickup apparatus according to claim 5, wherein said image sensing means has an accumulating effect, and wherein said control means includes:
   a. discriminating means for discriminating whether or not said amount of signal is above a prescribed value; and
   b. means for terminating the accumulation of said electrical signal of said image sensing means when said amount of signal is discriminated by said discriminating means to be above said prescribed value.

7. An apparatus comprising:
   a. image sensing means for converting an incoming radiation into an image signal, which comprises a light receiving surface, and at least one light reflecting surface which is formed on the light receiving surface, the reflecting surface being formed so as to reflect the radiation in a direction different from that of the incoming radiation;
   b. radiation receiving means receptive of the radiation reflected from the reflecting surface of said image sensing means, for producing a control signal; and
   c. control means for controlling said image signal of said image sensing means in response to an amount of radiation of the reflected portion of said incoming radiation above a prescribed value.

8. An apparatus according to claim 7, wherein said reflecting surface has characteristics of passing the incoming radiation together with characteristics of reflecting the incoming radiation.

9. An apparatus according to claim 7, wherein a plurality of said reflecting surfaces are formed on the light receiving surface of said image sensing means so as to have a diffraction grating effect.

10. An apparatus according to claim 8, wherein the passing radiation has substantially a different wave length from that of the reflecting radiation.

11. An apparatus according to claim 9, wherein said plurality of said reflecting surfaces form a strip shaped filter.

12. An apparatus according to claim 9, wherein said plurality of said reflecting surfaces have a repeated pattern provided on the light receiving surface of said image receiving means.

13. An apparatus according to claim 10, wherein the wave length of the passing radiation ranges over a visible wave length region.

14. An image pickup system comprising:

a. image sensing means for converting an incoming radiation into an image signal, the sensing means having a light responsive surface;
b. filtering means provided on the light responsive surface of said image sensing means for filtering out part of the incoming radiation toward the light responsive surface, so as to deflect the radiation;
c. radiation receiving means for receiving the deflected radiation from said filtering means to produce a corresponding signal; and
d. controlling means responsive to the corresponding signal for controlling the amount of the incoming radiation.

15. An image pickup system according to claim 14, further comprising:
   electronic flash means for generating a flash; and
   control means rsponsive to a signal produced from said radiation receiving means for controlling the flash generating of said electronic flash means.

16. An image pickup system according to claim 15, wherein said filtering means conducts part of said incoming radiation to said radiation receiving means by using a diffracting effect.

17. An image pickup system according to claim 15, wherein said filtering means conducts that radiation of said incoming radiation which has a particular wave length to said radiation receiving means.

18. An image pickup system according to claim 15, wherein said control means prevents said electronic flash means from generating flash when the signal produced from said radiation receiving means has become a prescribed state.

19. An image pickup system according to claim 15, further comprising:
   readout means for reading out said electrical signal from said image sensing means as the flash generating operation of said electronic flash means is controlled by said control means.

* * * * *